United States Patent [19]

Iinuma et al.

[11] Patent Number: 5,073,580

[45] Date of Patent: Dec. 17, 1991

[54] EPOXY RESIN COMPOSITION FOR USE IN SEALING SEMICONDUCTORS

[75] Inventors: Tomohisa Iinuma; Noriyuki Yamamoto; Hideki Kato, all of Aichi, Japan

[73] Assignee: Toagosei Chemical Industry Co., Ltd., Tokyo, Japan

[21] Appl. No.: 604,690

[22] Filed: Oct. 29, 1990

[51] Int. Cl.$^5$ .......................... C08K 3/30; C08K 3/08
[52] U.S. Cl. ..................................... 523/442; 523/460
[58] Field of Search ................................ 523/442, 460

[56] References Cited

U.S. PATENT DOCUMENTS 4,282,136  8/1981  Hunt et al. ............................. 260/38
4,668,719  5/1987  Kato et al. ............................ 523/458
4,716,184  12/1987  Kagawa et al. ....................... 523/310

FOREIGN PATENT DOCUMENTS 63-60112  3/1988  Japan .

OTHER PUBLICATIONS

*Indian Journal of Technology,* vol. 16, May 1978, pp. 211-212.

*Primary Examiner*—Paul R. Michl
*Assistant Examiner*—Christopher P. Rogers

*Attorney, Agent, or Firm*—Sughrue, Mion, Zinn, Macpeak & Seas

[57] ABSTRACT

An epoxy resin composition for use in sealing semiconductors, having enhanced moisture resistance reliability is disclosed, which comprises an epoxy resin and an oxyacid bismuth oxyhydroxide represented by the following formula (1):

$$Bi_xO_y(OH)_p(Y^{-a})_q(NO_3)_r \cdot nH_2O \qquad (1)$$

wherein $Y^{-a}$ represents a residue of an oxyacid other than nitrate; a represents the ionic valence, absolute value, of the residue of the oxyacid; and x, y, p, q, r and n each represents a value satisfying the following:

$1 \leq x \quad 1 \leq y \quad 0 \leq n$ $0.08\ x \leq p \leq 0.92\ x$ $0.02\ x \leq aq \leq 0.92\ x$ $0 \leq r \leq 0.1\ x$ $3\ x = 2\ y + p + aq + r$

7 Claims, No Drawings

EPOXY RESIN COMPOSITION FOR USE IN SEALING SEMICONDUCTORS

FIELD OF THE INVENTION

This invention relates to an epoxy resin composition for use in sealing semiconductors which are used in the electronics industry. More particularly, it relates to an epoxy resin composition for use in sealing semiconductors, which prevents sealed aluminum wiring, etc., from corroding and has enhanced moisture resistance reliability due to an oxyacid bismuth oxyhydroxide blended therewith.

BACKGROUND OF THE INVENTION

Many semiconductors such as IC, transistors, LSI, etc., are sealed using epoxy resin compositions.

Epoxy resin compositions comprise an epoxy resin as the principal component, a curing agent for the epoxy resin, a curing accelerator, an inorganic filler, a flame retarder, a pigment and a silane coupling agent. The epoxy resin compositions must have various characteristics such as flame retardance, reliability in terms of moisture resistance to water penetrating from the outside, high adhesion, crack resistance and electrical characteristics (e.g., high volume resistivity, etc.).

With the high level of integration of semiconductors which has occurred recently, the width of aluminum wiring on IC chips has been reduced and corrosion of aluminum has occurred prematurely. Corrosion is promoted by the presence of water which penetrates into the epoxy resin compositions. Accordingly, epoxy resin compositions must provide further improvement in the corrosion-resistance for aluminum wiring, etc., and must improve the reliability of aluminum wiring, etc., to moisture resistance (hereinafter generally called reliability on moisture resistance or moisture resistance reliability).

Further, since the heat generated is increased due to a reduction in the width of the wiring, a large amount of a flame retarder, such as antimony oxide or an inorganic hydroxide, is blended with the epoxy resin composition. However, the corrosion of aluminum wiring is further accelerated by the flame retarder component. This problem must be solved.

To solve this problem, use of antimony-bismuth or bismuth nitrate oxyhydroxides represented by the following formulae has been proposed (see, U.S. Pat. No. 4,716,184 and JP-A-63-60112 (the term "JP-A" as used herein means an "unexamined published Japanese patent application")):

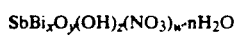

wherein x represents 0.2 to 2.0, y represents 1.0 to 5.0, z represents 0.1 to 3.0, w represents 0.1 to 3.0 and n represents 0.5 to 3.0; and

wherein $3.5 \leq x' \leq 5.5$ and n' represents 0 or a positive number.

Epoxy resin compositions for sealing semiconductors, which contain the above described bismuth compound prevent sealed wiring, etc., from corroding and have high reliability for moisture resistance.

When the above bismuth compound is blended with epoxy resin compositions, moisture resistance reliability can be improved. However, there are disadvantages with this approach in that electrical characteristics are deteriorated, the volume resistivity of resin compositions is reduced in comparison with resin compositions which do not include the bismuth compound, and the electric conductivity of hot water-extracted water is increased.

SUMMARY OF THE INVENTION

Research has been conducted to discover a bismuth compound having improved moisture resistance, reliability and flame retardance equal to that obtained by the aforesaid bismuth compound without detrimentally affecting the electrical characteristics (e.g., volume resistivity and electrical conductivity of hot water-extracted water, etc.,) of the epoxy resin compositions. As a result, it has been found that epoxy resin compositions obtained by blending oxyacid bismuth oxyhydroxide compounds represented by the following formula (1) provide excellent moisture resistance and reliability as well as excellent electrical conductivity. The present invention has been accomplished on the basis of this finding.

An object of the present invention is to provide an epoxy resin composition for use in sealing semiconductors, which contains a bismuth compound.

The present invention in one embodiment provides an epoxy resin composition for use in sealing semiconductors which comprises an epoxy resin and an oxyacid bismuth oxyhydroxide (hereinafter referred to simply as bismuth compound) represented by the following formula (1):

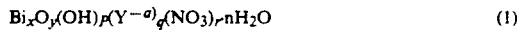

wherein $Y^{-a}$ represents a residue of an oxyacid other than a nitrate group; a represents the ionic valence (absolute value) of the residue of the oxyacid; and x, y, p, q, r and n each represents a value satisfying the following formulas:

$1 > x \ 1 \leq y \ 0 \leq n$ $0.08 \leq p \leq 0.92 \ x$ $0.02 \leq aq \leq 0.92 \ x$ $0 \leq r \leq 0.1 \ x$ $3 \ x = 2 \ y + p + aq + r$

DETAILED DESCRIPTION OF THE INVENTION

The residue of an oxyacid for $Y^{-a}$, which is a constituent of the bismuth compound of the present invention is represented by a unit obtained by removing a hydrogen atom or atoms from an oxyacid other than nitric acid. Any oxyacids other than nitric acid can be used without particular limitation, so long as oxygen atoms are present in the molecule, hydrogen ion is dissociated in an aqueous solution and are anionized. Examples of suitable oxyacids include carbonic acid, bicarbonic acid, metasilicic acid, orthosilicic acid, metabolic acid, orthoboric acid, phosphoric acid and carboxylic acids such as oxalic acid. These acids may be used either alone or as a combination of two or more thereof.

When oxyacids in the form of an aqueous solution have a lower limiting molar conductivity at 25° C., the bismuth compounds themselves and the epoxy resin compositions containing the same provide better electrical characteristics. Accordingly, the acids having a limiting molar conductivity of 70 S cm$^2$ mol$^{-1}$ or below are preferred. Examples of preferred acids used in the present invention are carbonic acid and bicarbonic acid.

Of the oxyacids, carbonic acid, bicarbonic acid, metasilicic acid, orthosilicic acid, metabolic acid and orthoboric acid are preferred from the viewpoint of greatly improving moisture resistance when the resulting bismuth compound is blended with the epoxy resin compositions.

Besides those derived from the above exemplified oxyacids, the residue of an oxyacid in formula (1) may be $ClO_2^-$, $ClO_3^-$, $ClO_4^-$, $H_xAsO_4^-$, $BrO_3^-$, $H_2PO_4^-$, $HPO_4^{-2}$, $HSO_3^-$, $HSO_4^-$, $H_2SbO_4^-$, $IO_3^-$, $IO_4^-$, $MnO_4^-$, $WO_4^{2-}$, $HCOO^-$, $ClCH_2COO^-$, $BrCH_2COO^-$, $FCH_2COO^-$, $ICH_2COO^-$, $NCCH_2COO^-$, $C_2H_5COO^-$, $C_3H_7COO^-$, $C_4H_9COO^-$, $C_6H_5COO^-$, $C_3H_2O_4^{2-}$, $C_4H_4O_6^{2-}$, $C_8H_5O_4^{2-}$, $MoO_4^{2-}$, $P_2O_7^{4-}$, $P_3O_9^{3-}$, $P_3O_{10}^{5-}$, $P_4O_{12}^{4-}$, $SO_3^{2-}$, $SO_4^{2-}$, $S_2O_3^{2-}$, $S_2O_4^{2-}$, $C_2O_4^{2-}$, $C_6H_5O_7^{3-}$ or the like.

Almost all of the bismuth compounds of formula (1) are novel compounds while some compounds are described in *Indian Journal of Technology*, vol. 16, pp. 211-212 (May 1978).

The bismuth compounds which are used in the present invention can be prepared in the following manner.

An aqueous alkaline solution, such as an aqueous solution of sodium hydroxide having a concentration of 5 to 40 wt %, is successively added to an aqueous solution of bismuth nitrate having a concentration of 1 to 60 wt %, preferably 10 to 50 wt %, to replace a desired proportion of nitrate in the bismuth nitrate with a hydroxyl group.

Subsequently, an aqueous solution of an alkali metal salt of an oxyacid is added thereto to replace the desired proportion of the remaining nitrate with the oxyacid to obtain the desired product.

When r in formula (1) is greater, a disadvantage occurs in that electrical characteristics are greatly deteriorated, for example, volume resistivity is reduced and electrical conductivity of hot water-extracted water is increased. Accordingly, r is in the range of $0 \leq r \leq 0.1$ x.

When p is large and aq is too small, moisture resistance reliability is reduced, while when p is small and aq is too large, the volume resistivity of the composition tends to be lowered. Accordingly, p is in the range of $0.08$ x $\leq p \leq 0.92$ x, preferably $0.5$ x $\leq p \leq 0.92$ x and aq is in the range of $0.02$ x $\leq aq \leq 0.92$ x, preferably $0.08$ x $\leq aq \leq 0.5$ x.

Any epoxy resins can be used as the principal component in the epoxy resin compositions of the present invention without particular limitation with regard to the type of epoxy resins, so long as the epoxy resins have at least two epoxy group per molecule and can be cured. Examples of suitable epoxy resins include those used in conventional molding materials, such as cresolic novolak type epoxy resins, phenolic novolak type epoxy resins, bisphenol A type epoxy resins and alicyclic epoxy resins, with the first three epoxy resins being preferred.

The epoxy equivalent of the resins which can be used in the present invention is preferably 150 to 300. Epoxy resins having a hydrolyzable chlorine content of not higher than 1000 ppm, particularly not higher than 500 ppm, have good moisture resistance and are preferred.

Examples of curing agents for the epoxy resin compositions include acid anhydrides such as tetrahydrophthalic anhydride or hexahydrophthalic anhydride; amines such as diethylene triamine or diaminodiphenylmethane; and curing agents for novolak type epoxy resins, such as cresol novolak resins or phenol novolak resin.

Examples of inorganic fillers which can be used in the present invention include crystalline silica powder, quartz glass powder, fused silica powder, alumina powder and talc. Of these, crystalline silica powder, quartz glass powder and fused silica powder are inexpensive and preferred. The fibers generally have a particle size (diameter) of 0.1 to 150 μm, preferably 10 to 30 μm, and they are generally added in an amount of 20 to 90 wt %, preferably 30 to 80 wt %, based on the total amount of the composition.

If desired, a curing accelerator, a flame retarder, a coupling agent, a color pigment and a release agent as described in U.S. Pat. No. 4,282,136 may be added to the epoxy resin compositions of the present invention.

Examples of suitable curing accelerators include amine, phosphorus and imidazole accelerators. Examples of flame retarders include antimony oxide and halogenated epoxy resins Examples of coupling agents include silane and titanium coupling agents. Examples of release agents include various waxes such as aliphatic paraffin and higher aliphatic alcohols.

The epoxy resin compositions of the present invention can be obtained by blending the above-described components in a conventional manner, kneading the resulting blend in a heated state in a kneader to form a semi-cured resin composition, cooling it to room temperature (about 20°-30° C.), crushing it using known methods and optionally tabletting the crushed product.

The ratio of the bismuth compound in the epoxy resin composition is preferably 0.1 to 10 wt %, more preferably 1 to 5 wt %, based on the total amount of the composition. When the ratio is less than 0.1 wt %, the amount of the bismuth compound present in the composition is too small and the effect of improving moisture resistance, etc., is low, while an amount of the bismuth compound greater than 10 wt % does not provide an increased benefit but merely increases the cost.

With regard to the particle size of the bismuth compound, a smaller particle size is preferred, because the compound can be well dispersed in the epoxy resin composition, surface area is increased and moisture resistance is enhanced. Specifically, an average particle size if not larger than 30 μm, particularly not larger than, 5 μm, and maximum particle size of not larger than 150 μm, particularly not larger than 30 μm, are preferred.

The epoxy resin compositions for use in sealing semiconductors according to the present invention do not corrode aluminum wiring, etc., and have high moisture resistance reliability. Not much difference exists in electrical characteristics between the epoxy resin composition of the present invention and conventional epoxy resin composition containing no oxyacid bismuth oxyhydroxide compound.

The reason why electrical characteristics are not deteriorated is unclear so far. However, while not desiring to be bound, the effect obtained by the present invention is thought to be due to the fact that the amount of nitrate in the bismuth compound is small, this nitrate being a source of free nitrate ion which causes the deterioration in the electrical characteristics.

The present invention is now illustrated in greater detail by reference to the synthesis examples of the bismuth compound and the following examples and comparative examples. In the following examples, parts, ratios and % are by weight.

SYNTHESIS EXAMPLE 1

To 760 g of an aqueous solution of bismuth nitrate pentahydrate ($Bi(NO_3)_3 \cdot 5 H_2O$) (concentration 51.4% in terms of $Bi(NO_3)_3 \cdot 5 H_2O$; the content of free nitric acid 5.9%) was added 814.4 g of an aqueous solution of 15% NaOH at a rate of 20 ml/min using a constant delivery pump while keeping the reaction temperature at 25° C.

The resulting slurry was divided into four equal parts (referred to herein as A, B, C and D). Water was added to each of slurries A and B. Decantation was carried out three times. After the completion of decantation, 41.0 g and 52.8 g of an aqueous solution of 1N-NaHCO: were added to A and B, respectively. The mixtures were stirred at room temperature overnight.

With regard to the slurries C and D, 41.0 g and 52.8 g of an aqueous solution of 1N-NaHCO₃ was added to C and D, respectively, without decantation after the completion of the addition of the aqueous NaOH solution. The mixtures were stirred at room temperature overnight.

After the completion of stirring, each was filtered through a No. 2 filter paper and the product was washed with distilled water, placed in a box type drier and dried at 110° C. for 15 hours.

The dried product was crushed using a desk crusher to obtain each of bismuth compounds A to D. These compounds were analyzed. The analysis showed that each product had the following composition.

Bismuth Compound A:

$Bi_6O_6(OH)_{0.01}(NO_3)_{0.25}(HCO_3)_{5.74} \cdot 0.68H_2O$

Bismuth Compound B:

$Bi_6O_6(OH)_{0.01}(HCO_3)_{5.99} \cdot 0.76H_2O$

Bismuth Compound C:

$Bi_6O_6(OH)_{3.62}(NO_3)_{0.68}(HCO_3)_{1.70} \cdot 0.74H_2O$

Bismuth Compound D:

$Bi_6O_6(OH)_{3.13}(NO_3)_{0.52}(HCO_3)_{2.35} \cdot 0.62H_2O$

SYNTHESIS EXAMPLE 2

To 285 g of a aqueous solution of bismuth nitrate pentahydrate ($Bi(NO_3)_3 \cdot 5H_2O$) (concentration 51.1% in terms of $Bi(NO_3)_3 \cdot 5H_2O$; the content of free nitric acid 5.2%) was added 33.3 g of an aqueous solution of 15% NaOH at a rate of 15 ml/min using a constant delivery pump while keeping the reaction temperature at 25° C.

The resulting slurry was divided into three equal parts (referred to as E, F and G). Subsequently, 377.3 g, 566 g and 754 g of an aqueous solution of 15% $Na_2SiO_3 \cdot 9H_2O$ were added to slurries E, F and G, respectively. The addition was made at a rate of 10 ml/min through a constant delivery pump. After the completion of addition, each solution was stirred for 30 minutes and filtered through a No. 2 filter paper. The product was washed with distilled water and placed in a box type drier and dried at 110° C. for 15 hours.

The dried product was crushed by using a desk crusher to obtain each of bismuth compounds E to G. These compounds were analyzed. The analysis showed that each product had the following composition.

Bismuth Compound E:

$Bi_6O_6(OH)_{3.90}(NO_3)_{0.89}(HSiO_3)_{1.21} \cdot 0.98H_2O$

Bismuth Compound F:

$Bi_6O_6(OH)_{4.90}(NO_3)_{0.38}(HSiO_3)_{0.72} \cdot 0.97H_2O$

Bismuth Compound G:

$Bi_6O_6(OH)_{5.24}(NO_3)_{0.23}(HSiO_3)_{0.53} \cdot 0.67H_2O$

SYNTHESIS EXAMPLE 3

A bismuth compound H having the following composition was prepared in the same manner as in the preparation of the bismuth compound D of Synthesis Example 1 except that 52.8 g of an aqueous solution of 1N $NaBO_2 \cdot 4H_2O$ was used in place of the aqueous $NaHCO_3$ solution.

$Bi_6O_6(OH)_{5.3}(H_2BO_3)_{0.7} \cdot 0.9H_2O$

EXAMPLES 1 TO 5 AND COMPARATIVE EXAMPLES 1 AND 2

Five parts of the bismuth compound, etc., shown in Table 1 below was blended with 80 parts of a cresolic novolak type epoxy resin (epoxy equivalent: 235), 20 parts of brominated phenolic novolak type epoxy resin (epoxy equivalent: 275), 50 parts of phenolic novolak resin (molecular weight: 700 to 1000), 2 parts of triphenylphosphine, 1 part of carnauba wax, 1 part of carbon black, 370 parts of fused silica and 2 parts of a silane coupling agent ("A-18", a tradename of γ-glycidoxypropyltrimethoxysilane, produced by Nippon Uniker K.K.). The resulting mixture was kneaded using heated rollers for 3 to 5 minutes, cooled and crushed to obtain a powdered epoxy resin composition.

The thus-prepared compositions were sieved and samples through a 100-mesh sieve were subjected to the following testing.

2 g of each of the samples was weighed and 500 ml of pure water was added thereto. After the mixture was kept in pressurized water at 120° C. for 100 hours under a pressure of 3 kg/cm², the electrical conductivity of the water extracted therefrom was measured. In this measurement, the average of three samples was used.

Each sample was put into a mold press and molded and cured under conditions of 175° C. and 100 kg/cm² for 45 minutes to prepare a sample according to JIS-K6911. The volume resistivity thereof was measured.

Further, an element for evaluation of moisture resistance, to which an aluminum wire was connected, was sealed using the same sample under molding condition of 170° C. at a setting time of 3 minutes. The sealed sample was subjected to pressure-cooker testing at 125° C., and the time until disconnection of the aluminum wire taking place was measured. In the measurement of volume resistivity and the pressure-cooker testing, the average of 50 samples was determined. The results obtained are also shown in Table 1.

The following bismuth compounds, etc., were used in the testing:

(1) Bismuth compound wherein the oxyacid is bicarbonic acid. Namely, Bismuth Compound D of Synthetic Example 1.
(2) Bismuth compound wherein the oxyacid is metasilicic acid. Namely, Bismuth Compound G of Synthetic Example 2.
(3) Bismuth compound wherein the oxyacid is boric acid. Namely, Bismuth Compound H of Synthetic Example 3.
(4) Antimonic acid $Sb_2O_5 \cdot 2H_2O$ (5) Bismuth compound wherein the oxyacid is nitric acid.

$Bi_6O_6(OH)_{4.2}(NO_3)_{1.8} \cdot 0.9H_2O$

TABLE 1

|  | Bismuth Compound, etc. | Electrical Conductivity of Extracted Water | Volume Resistivity | Time until Disconnection Took Place |
|---|---|---|---|---|
|  |  | (μs/cm) | (Ω·cm) | (hr) |
| Ex. 1 | (1) | 68 | $3 \times 10^{15}$ | 620 |
| Ex. 2 | (1) + (4) | 73 | $9 \times 10^{14}$ | 600 |
| Ex. 3 | (2) | 60 | $1 \times 10^{15}$ | 610 |
| Ex. 4 | (2) + (4) | 75 | $1 \times 10^{15}$ | 615 |
| Ex. 5 | (3) | 70 | $3 \times 10^{15}$ | 605 |
| Comp. Ex. 1 | (5) | 150 | $9 \times 10^{13}$ | 600 |
| Comp. Ex. 2 | None | 74 | $4 \times 10^{15}$ | 150 |

The epoxy resin compositions for use in sealing semiconductors according to the present invention provide sealed wiring, etc., with an excellent corrosion-resisting effect, high moisture resistance reliability and excellent electrical characteristics.

While the present invention has been described in detail and with reference to specific embodiments thereof, it is apparent to one skilled in the art that various changes and modifications can be made therein without departing from the spirit and the scope of the present invention.

What is claimed is:

1. An epoxy resin composition for use in sealing semiconductors, which comprises an epoxy resin and an oxyacid bismuth oxyhydroxide represented by the following formula (1):

$$Bi_xO_y(OH)_p(Y^{-a})_q(NO_3)_r \cdot nH_2O \qquad (1)$$

wherein $Y^{-a}$ represents a residue of an oxyacid other than nitrate; a represents the ionic valence, absolute value of the residue of the oxyacid; and x, y, p, q, r and n each represents a value satisfying the following:

$1 \leq x$   $1 \leq y$   $0 \leq n$ $0.08\, x \leq p \leq 0.92\, x$ $0.02\, x \leq aq \leq 0.92\, x$ $0 \leq r \leq 0.1\, x$ $3x = 2y + p + aq + r$ 2. The epoxy resin composition of claim 1, wherein p and q each represents a value satisfying the following:

$0.5\, x \leq p \leq 0.92\, x$ $0.08\, x \leq aq \leq 0.5\, x$

3. The epoxy resin composition of claim 1, wherein the epoxy resin is a cresolic novolak type epoxy resin, a phenolic novolak type epoxy resin or a bisphenol A type epoxy resin.

4. The epoxy resin composition of claim 1, wherein the composition additionally includes at least a curing accelerator, a flame retarder, a coupling agent, a color pigment and a release agent.

5. The epoxy resin composition of claim 1, wherein the oxyacid bismuth oxyhydroxide is present in an amount of 0.1 to 10% by weight based on the total weight of the epoxy composition.

6. The epoxy resin composition of claim 1, wherein the average particle size of the oxyacid bismuth oxyhydroxide is 30 μm or less and the maximum particle size is 150 μm or less.

7. The epoxy resin composition of claim 6, wherein the average particle size of the oxyacid bismuth oxyhydroxide is 5 μm or less and the maximum particle size is 30 μm or less.

* * * * *